A. J. MACY.
AUTOMATIC PILOT MECHANISM.
APPLICATION FILED AUG. 8, 1913. RENEWED OCT. 18, 1916.
1,228,364. Patented May 29, 1917.
4 SHEETS—SHEET 4.
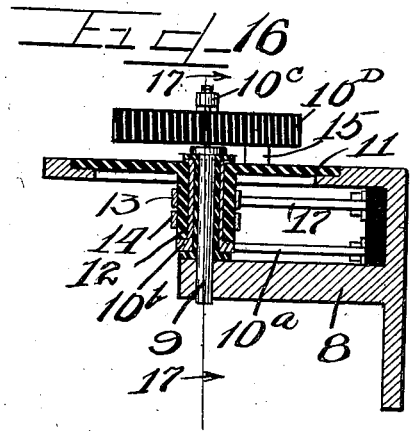
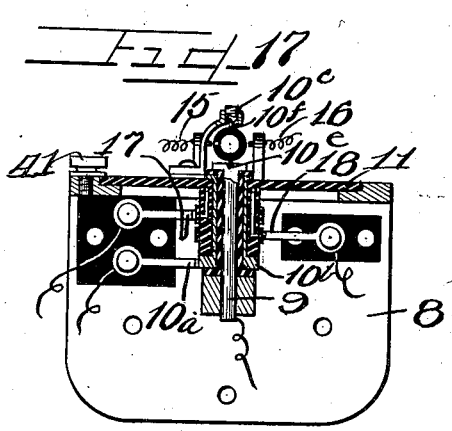
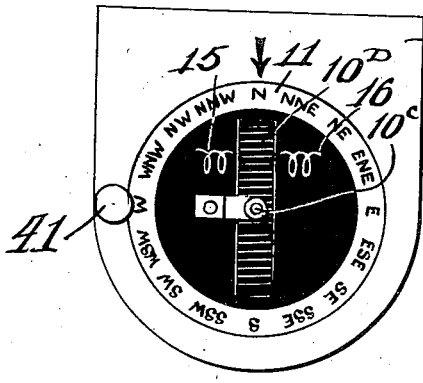
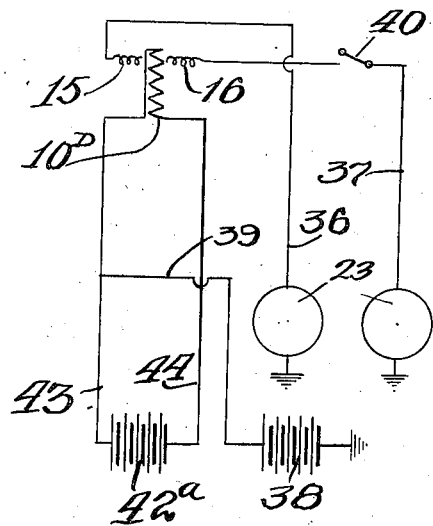

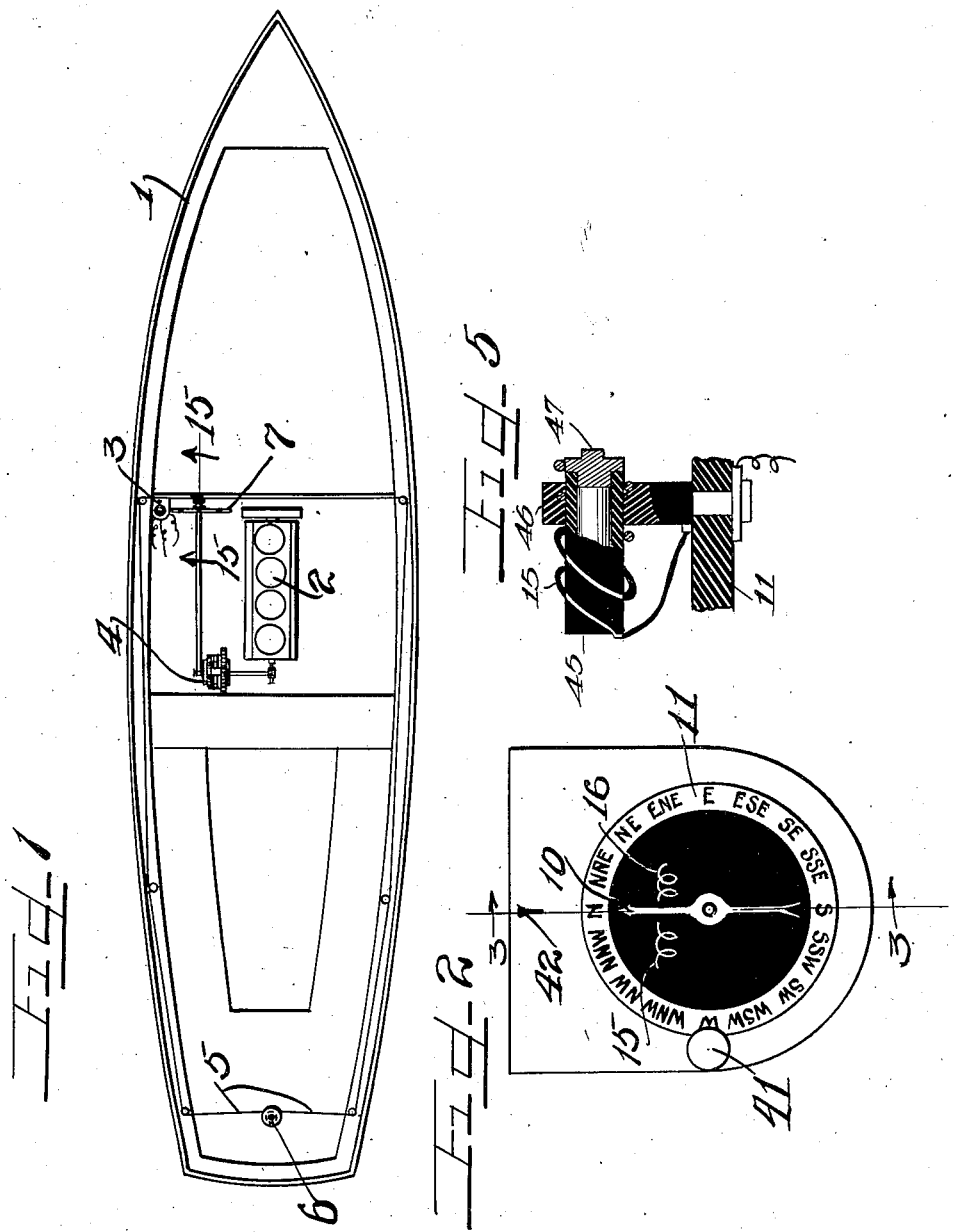

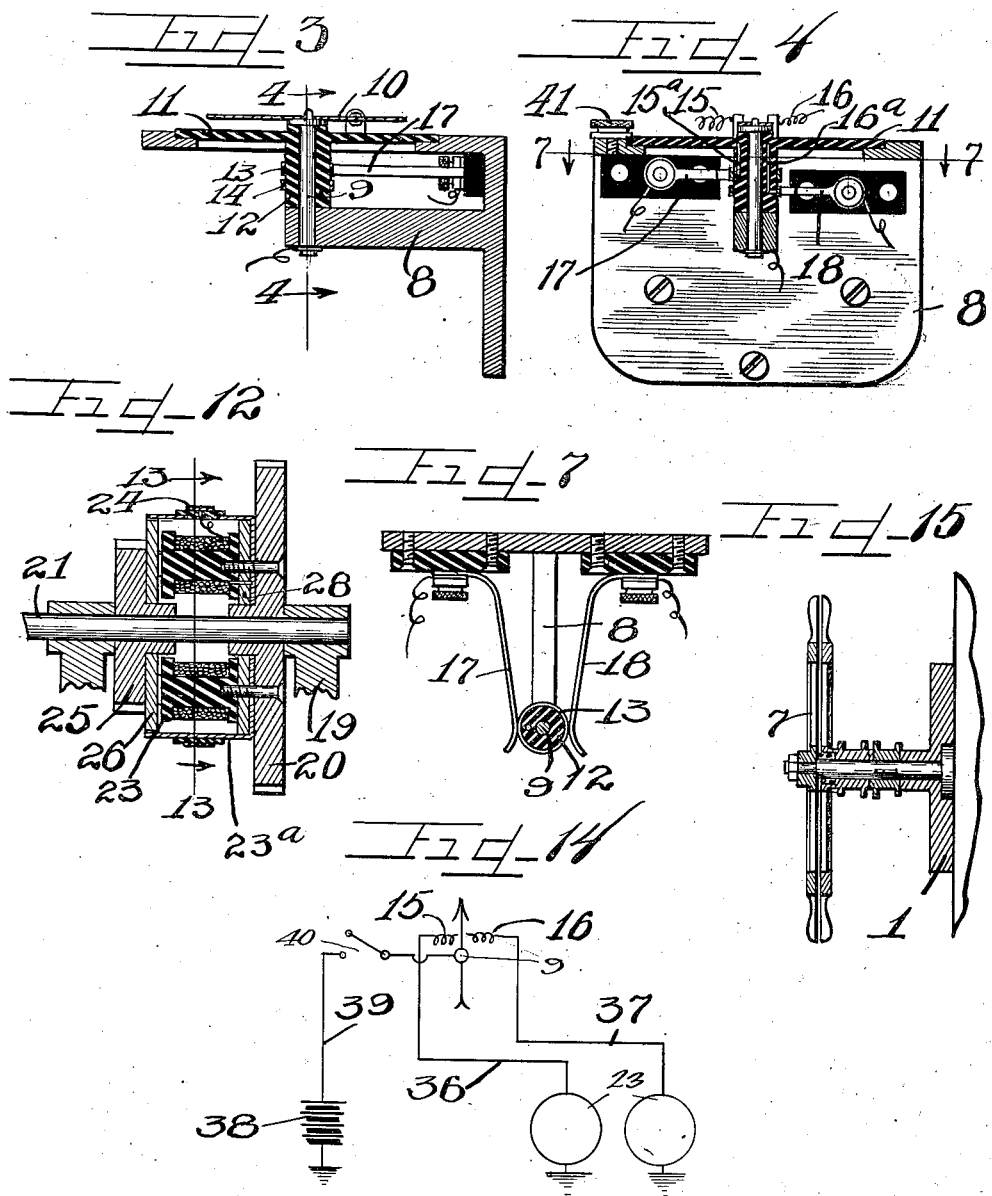

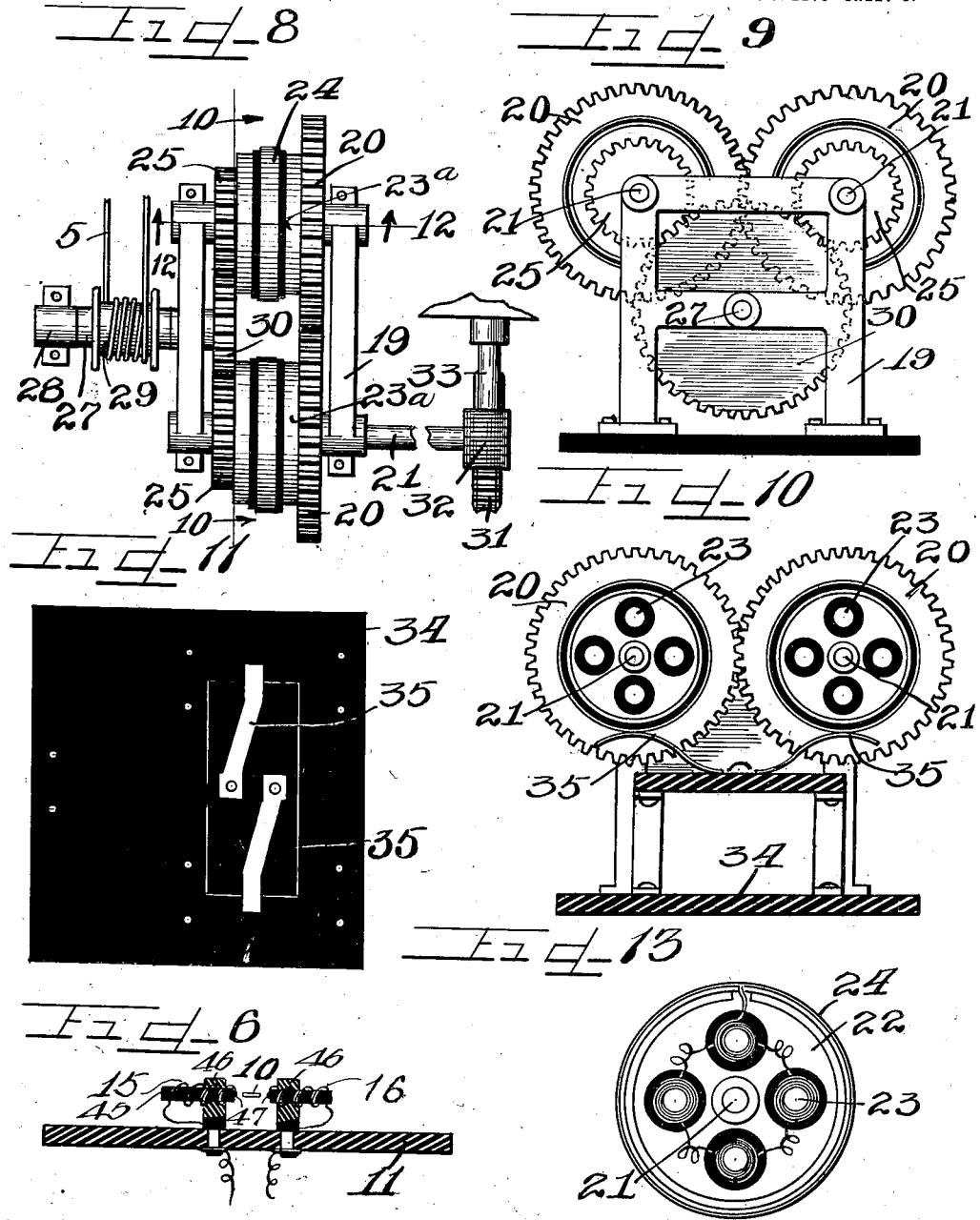

UNITED STATES PATENT OFFICE.

ALFRED J. MACY, OF CHICAGO, ILLINOIS.

AUTOMATIC PILOT MECHANISM.

1,228,364.     Specification of Letters Patent.     Patented May 29, 1917.

Application filed August 8, 1913, Serial No. 783,683. Renewed October 18, 1916. Serial No. 126,453.

*To all whom it may concern:*

Be it known that I, ALFRED J. MACY, a citizen of the United States, and a resident of the city of Chicago, in the county of Cook and State of Illinois, have invented certain new and useful Improvements in Automatic Pilot Mechanism; and I do hereby declare that the following is a full, clear, and exact description of the same, reference being had to the accompanying drawings, and to the numbers of reference marked thereon, which form a part of this specification.

The proper guiding of a vehicle on land or water or in open tracts where land marks or other bearings are unavailable, has necessitated the use of a magnetic compass to properly locate the vehicle upon its true course. This being the case, a pilot must be constantly at the helm of the same to correct any deviations thereof from its course.

This invention relates to mechanism associated with a magnetic compass needle whereby the steering means of a ship or vehicle are set in operation by power driven means when said ship or vehicle deviates from its course to restore the same thereto.

It is an object of this invention to provide an automatic pilot mechanism for a vehicle which will act when adjusted to maintain the same in a predetermined course.

It is also an object of this invention, to provide a device acting magnetically to maintain a vehicle in a predetermined course.

It is also an object of this invention to provide a device wherein magnetically controlled means serve to set in operation power driven mechanisms for the steering means of a vehicle, when said vehicle is deviated from a predetermined course to restore the same thereto.

It is also an object of this invention to provide electrical contact means associated with a compass dial, said contacts adapted to be closed by a compass needle to thereby close an electrical circuit, and with magnetically operating power driven means connected to the steering means of a vehicle and set in operation by said compass to properly steer the vehicle.

It is also an object of this invention to provide electrical means associated with a compass, whereby a vehicle to which said compass is attached may be maintained in a true course at all times, any deviation therefrom being instantly corrected by mechanism set in operation through said electrical means to properly guide the vehicle.

It is also an object of this invention to provide automatic pilot mechanism associated with a compass needle, the electrical elements of said pilot mechanism being so disposed adjacent said compass needle as to exert no counteracting magnetic effects to cause a declination of the compass needle.

It is also an object of this invention to construct an electrically operated magnetically controlled steering means for a vehicle, wherein the electrical connections are so disposed as to exert no magnetic influence on said magnetic controlling means.

It is furthermore an object of this invention to provide a device having a rotatable table with indications thereon and capable of adjustment to any desired position wherein it may be retained by suitable clamping means to indicate the proper course for a vehicle to which it is attached, and magnetic means associated therewith adapted to close electrical contacts to correct any deviations of a vehicle from its course.

It is finally an object of this invention to construct a device consisting of few parts, and simple in operation and adjustment.

The invention (in a preferred form) is hereinafter more fully described and defined in the accompanying drawings and specification.

In the drawings:

Figure 1 is diagrammatic top plan view of a boat showing a device embodying the principles of my invention adapted thereto.

Fig. 2 is an enlarged top plan view of the device.

Fig. 3 is a section on line 3—3 of Fig. 2.

Fig. 4 is a section taken on line 4—4 of Fig. 3.

Fig. 5 is an enlarged fragmentary section showing the detailed arrangement of one of the coils and the electrical contact point, with parts shown in section and parts in elevation.

Fig. 6 is an enlarged fragmentary section similar to Fig. 4, showing the relation of the electrical contacts and the compass needle.

Fig. 7 is a section taken on line 7—7 of Fig. 4.

Fig. 8 is a top plan view of the magnetic clutch members.

Fig. 9 is an end elevation thereof.

Fig. 10 is a section taken on line 10—10 of Fig. 8.

Fig. 11 is a top plan view of the insulated base member for said clutch members showing the contact brushes thereon.

Fig. 12 is a section taken on line 12—12 of Fig. 8.

Fig. 13 is a section taken on line 13—13 of Fig. 12.

Fig. 14 is a schematic of the electrical connections.

Fig. 15 is a section taken on line 15—15 of Fig. 1.

Fig. 16 is a view similar to Fig. 3 of a modification.

Fig. 17 is a section on line 17—17 of Fig. 16.

Fig. 18 is a top plan view of a modified form.

Fig. 19 is a schematic of electrical connections used in a modified form of the device.

Fig. 20 is an enlarged fragmentary section similar to Fig. 6, showing the detailed arrangement of one of the coils and the electrical contact point, with parts shown in section and parts in elevation.

As shown in the drawings:

For convenience the device is illustrated as attached to a boat, denoted by the reference numeral 1, although it is obvious that it is adaptable to any type of vehicle. The boat is provided with a power plant indicated by 2, and a compass control element 3, magnetically operating mechanisms thrown into operation thereby denoted by the reference numeral 4, and steering cables 5, connected thereto and to a rudder 6, and also to a steering wheel 7.

The compass control for the magnetic clutches comprises a bracket 8, and extending therethrough and insulated therefrom is an electrical conductor supporting pin 9, for a compass needle 10. An insulating rotatable table 11, having an extended boss 12, is journaled on said pin 9, and on its upper surface is provided with indications denoting the points of the compass, and secured on said boss 12, are contact rings 13, and 14, respectively. Secured on the upper surface of said table 11, preferably on each side of the north end of said needle 10, are coils 15 and 16, having non-magnetic cores 45, of fiber or other non-magnetic material secured in short upright standards 46, on the face of said table 11, and with contact points 47, recessed into the adjacent ends of the respective core members and in electrical communication with the ends of the respective coils 15 and 16. Embedded in said insulating table and extending to the respective contact rings on the boss thereof are conductors 15ª, and 16ª, respectively leading to the coils 15 and 16. Also mounted on said bracket 8, and insulated therefrom are contact brushes 17 and 18, respectively, adapted to contact the rings 13 and 14.

A frame 19, is mounted adjacent the power plant 2, and supports the magnetic clutches 4, already mentioned, each of which comprises a gear 20, secured upon a shaft 21, and having fastened on the inner face thereof a disk 22, bearing a plurality of electro-magnets 23, connected in multiple to one another. An outer cylindrical member 23ª, is secured between said disk 22, and said gear 20, and projects over said electro-magnets to inclose the same, and mounted on the outer periphery thereof and insulated therefrom is a contact ring 24, to which one terminal of the electro-magnets is connected. The other terminal of said electro-magnets is grounded at any convenient point on the device.

Another gear 25, is slidably and rotatably mounted on said shaft 21, and has secured on the inner face thereof, a magnetic disk 26, such that when said electro-magnets are energized said disk 26, being held thereby, will constrain said gear 25, to rotate therewith. A drum shaft 27, is journaled at one of its ends in said frame 19, and at its other end in an outer bearing 28, said shaft having rigidly secured thereon a drum 29. Keyed on the inner end of said drum shaft is a gear 30, which meshes at all times with each of said gears 25, secured on the respective clutch shafts 21. Each of said large gears 20, mesh with each other and one of said shafts 21, is extended and provided with a worm gear 31, which meshes with a worm 32, secured on the crank shaft 33, of said power plant 2, to be driven thereby.

Thus it is apparent that each of said shafts 21, may rotate continually, due to the intermeshing of the respective gears 20, thereon, and when either one or the other of the magnetic clutches are energized, one of said gears 25, being caused to rotate thereby, will cause rotation of said drum shaft in one direction, and the other gear 25, when driven will likewise cause rotation thereof in the opposite direction, of course, it being impossible for both of said magnetic clutches to be energized at the same time.

Said frame 19, is mounted on an insulating base 34, and, projecting upwardly from a sub-base thereon, are contact brushes, one for each of the contact rings 24, already mentioned. Electrical conductors 36, and 37, lead from binding posts attached to the respective contact brushes 35. Any suitable source of electromotive force, such as a storage battery or generator 38, is connected in the circuit with one terminal thereof grounded and the other connected by means of a conductor 39, to the supporting pin 9, for the compass needle, and at any convenient point in said latter conductor, switch 40, is inserted to provide a means of entirely disconnecting the electrical mechanism from the compass contacts. The rudder controlling cables 5, are wound about the drums on said steering wheel 7, and likewise trained over and around the drum 29, mounted on said magnetic clutch device, so that the boat may be either steered by manually turning the steering wheel 7, of course with said switch 40, in open position or when said switch 40, is closed any deviations of a boat from a predetermined course will close an electrical contact, thereby setting in operation one of the magnetic clutches, and turning the rudder in a direction to correct the deviation of a boat from its course. A clamping screw 41, is threaded into the upper portion of said bracket 8, and is adapted to clamp against said rotatable table 11, after the boat has been directed in its course, indicated by the mark 42, on the upper surface of said supporting bracket and the table 11, having been moved into a position with the electrical contacts symmetrically disposed about a true north and south axis thereof, or on each side of the compass needle.

In the modified form illustrated in the Figs. 16 to 19, inclusive, the hub 12, of the rotatable table 11, is slightly longer and is provided with a third brush contact member 10$^b$, adapted to be contacted by a brush 10$^a$, secured on said bracket 8, and a contact member 10$^c$ is mounted on said rotatable table 11, with the contact portion thereof coaxial with the said supporting pin 9. In place of the compass needle, a solenoid 10$^D$, is provided and the terminals of the winding thereon, end respectively at a lower and upper portion respectively of said solenoid, one terminal ending in a point 10$^e$, which rests in a suitable axial aperture in said pin 9, thus affording electrical connection therethrough.

The other terminal of said winding is connected to a pin 10$^f$, which projects upwardly into an axial aperture in said contact member 10$^e$, affording electrical communication therethrough and thence to said brush 10$^b$, by means of suitable conductors extending downwardly through the hub 12 of said rotatable table. The object of using a solenoid 10$^D$, in place of a compass needle, is to obtain a magnetic pointer or magnet of greater strength than a permanent magnetic compass needle, the strength of course being governed by the number of turns of wire thereon and the current flowing therethrough, so it is obvious that the solenoid may be made a magnet of great deal greater strength than the compass needle, and therefore increasing the sensitiveness of the device.

For this purpose a source of E. M. F. 42$^a$, is at all times in circuit with said solenoid through lead wires 43, and 44, respectively, the lead 43, and the lead 39, from the contact energizing source of E. M. F. 38, being joined and connected to said supporting pin 9, of the device. Of course, the same coils 15 and 16, are used with the same connections as in the prior construction described with reference to the compass needle, the only difference being the replacement of the compass needle, by a solenoid and a separate means for energizing said solenoid at all times. The electrical connections leading to the solenoid are disposed oppositely to one another in all their relations so that the stray fields created by the wires carrying the current are neutralized by one another and will have no tendency to effect the operation of the solenoid as a compass needle.

The operation is as follows:

The bracket 8, of course is secured permanently at a convenient position on the boat or vehicle to which it is attached, and with the indication 42, in line with or in a line parallel to the longitudinal axis of the vehicle. When the course of the ship is determined, for instance in this case shown as true north, the rotatable table 11, is rotated with the north character thereon radially in line with said indication 42, and assuming the compass needle to point true north, the various elements will be in the position shown in Fig. 2. However, should the vehicle be directed at any other point of the compass, such a point having been previously predetermined before the start of the vehicle, the rotatable table 11, is moved until the corresponding indication thereon is in line with said mark 42, and is then clamped by means of said screw 41, from further rotation. If, for any reason, the vehicle should not be directed truly upon its course, the compass needle will bear against one of said contacts 47, thereby closing one of the electrical circuits to operate the proper magnetic clutch, and cause actuation of the steering mechanism to restore the vehicle into its proper course, after which the compass needle will be directed equidistantly between the respective contacts and out of contact therewith.

Reference to Fig. 14, will show that the respective conductors in the neighborhood of the compass needle are led to the respective coils 15 and 16, wound on fiber tubes to prevent permanent magnetizing, so that the magnetic field created by a coil when a contact is closed will create a north field similar to the field at the north end of the needle to repel the compass needle, thus causing breaking of the contact. If the strength of a contact field should be greater than that of the earth field controlling the compass needle, and the contact be broken, such a breaking of the contact and cessation of the electric current will cause the contact field to vanish and the compass needle, due to the earth field, will again be moved against the contact and close the circuit, such repeated contacts serving to operate the respective clutch mechanism until the vehicle or ship is directed truly upon its course.

It is obvious that there is no tendency for the compass needle to stick on either of the electrical contacts disposed on either side thereof, due to the creation of the magnetic field by the passage of a current therethrough, and that the compass needle may oscillate from one contact to another, or to and from one contact alone, thus operating the respective magnetic clutch member to insure the maintenance of the vehicle upon its true course.

I am aware that various details of construction may be varied through a wide range without departing from the principles of this invention. I therefore do not purpose limiting the patent granted otherwise than necessitated by the prior art.

I claim as my invention:

1. In a device of the class described the combination of a compass needle, magnetic coils adjacent thereto, a contact associated with each of said coils adapted to be closed by said needle to form a circuit and energize the coil, a magnetic clutch adapted to be set in operation when a contact is closed, the field set up by the energized coil acting to repel the needle and break the circuit.

2. In a device of the class described, steering mechanisms for a vehicle, power driven magnetic clutches, a compass needle adapted to close electrical contacts to set said magnetic clutches in operation to steer the vehicle, and magnetic means acting to repel said needle when a contact is closed to break the circuit.

3. In combination with a vehicle and steering means therefor, a compass, a rotatable table therefor, means on said table for holding the same in stationary position after adjustment, magnetic coils on said table adapted to be disposed symmetrically on each side of a compass needle, electrical connections adapted to be effected through said compass needle and said coils, to set said steering means in operation.

4. In a device of the class described, a compass needle, a rotatable table therefor, contact coils thereon adapted to be temporarily energized by contact with said compass needle, steering mechanism for a vehicle, magnetic clutches connected thereto to drive the same, and means energizing said clutches when said electrical contacts are closed to drive the steering mechanism of said vehicle.

5. In a device of the class described the combination of a compass needle, coils adjacent thereto, contacts associated with said coils adapted to be closed by said needle to form a circuit and energize said coils, and steering mechanism adapted to be set in operation when the contacts are closed.

6. In a device of the class described the combination with steering means for a vehicle and power driven means therefor, of a rotary plate, electrical contact coils on said plate, a compass needle mounted on said plate between said coils adapted to close the circuit through said coils, a boss below said plate, a plurality of contact rings on said boss, and a plurality of insulated contact brushes mounted below said plate adapted to contact said rings to set said power driven means in operation when said needle contacts said coils.

7. In a device of the class described steering means for a vehicle, power driven means therefor, electrical contacts connected to said power driven means, a compass needle adapted to contact said contacts to set said power driven means in operation, and means in circuit with said compass needle to repel the same from said contacts and break the circuit to said power driven means.

8. In a device of the class described a compass needle, magnet coils, electrical contacts therefor adapted to be closed by said needle so arranged that the field created by the coils will cause breaking of said contacts by said needle, and steering mechanism operated by the closure of said contacts to maintain the vehicle in a predetermined course of movement.

9. In a device of the class described oscillatable means, electrical contact coils arranged to be contacted by said means so that the electric field created by said coils will cause breaking of said contacts by said means, and gear driven electro-magnetically controlled clutches energized by the closure of said contacts acting to maintain the vehicle in a predetermined course of movement.

In testimony whereof I have hereunto subscribed my name in the presence of two subscribing witnesses.

ALFRED J. MACY.

Witnesses:
CHARLES HILLS, Jr.,
LEON M. REIBSTEIN.